United States Patent [19]

Donlon et al.

[11] Patent Number: 5,209,296
[45] Date of Patent: May 11, 1993

[54] ACIDIZING METHOD FOR GRAVEL PACKING WELLS

[75] Inventors: William P. Donlon; Lloyd G. Jones; E. Thomas Strom, all of Dallas; Charles S. Yeh, Plano, all of Tex.

[73] Assignee: Mobil Oil Corporation, Fairfax, Va.

[21] Appl. No.: 943,647

[22] Filed: Sep. 11, 1992

Related U.S. Application Data

[63] Continuation-in-part of Ser. No. 810,463, Dec. 19, 1991.

[51] Int. Cl.$^5$ ............................ E21B 43/04; E21B 43/27
[52] U.S. Cl. .................................... 166/276; 166/281; 166/278; 166/307; 166/292
[58] Field of Search ............... 166/276, 278, 307, 292, 166/294, 295, 281, 297, 298

[56] References Cited

U.S. PATENT DOCUMENTS

| | | | |
|---|---|---|---|
| 3,627,046 | 12/1971 | Miller | 166/278 |
| 3,765,484 | 10/1973 | Hamby, Jr. | 166/307 X |
| 4,031,959 | 6/1977 | Henderson | 166/278 X |
| 4,817,717 | 4/1989 | Jennings, Jr. et al. | 166/278 |
| 4,921,047 | 5/1990 | Summers et al. | 166/276 |
| 5,101,901 | 4/1992 | Shu et al. | 166/276 |

*Primary Examiner*—Stephen J. Novosad
*Attorney, Agent, or Firm*—A. J. McKillop; G. W. Hager; C. A. Malone

[57] ABSTRACT

A method for producing substantially sand or fines free hydrocarbonaceous fluids from a wellbore which is initially gravel packed. Thereafter, an acid is directed into the wellbore so as to dissolve formation fines in channels contained in perforations communicating with a productive interval of the formation. The acid is of a strength sufficient to dissolve said fines. After the fines are dissolved, a sand consolidation agent is introduced into the perforations before the channels can be filled with formation fines. The consolidation agent remains in the perforations for a time sufficient to form a cement in situ which cement has permeability retentive characteristics. The cement forms pores of a size sufficient to exclude formation fines from the wellbore.

9 Claims, 1 Drawing Sheet

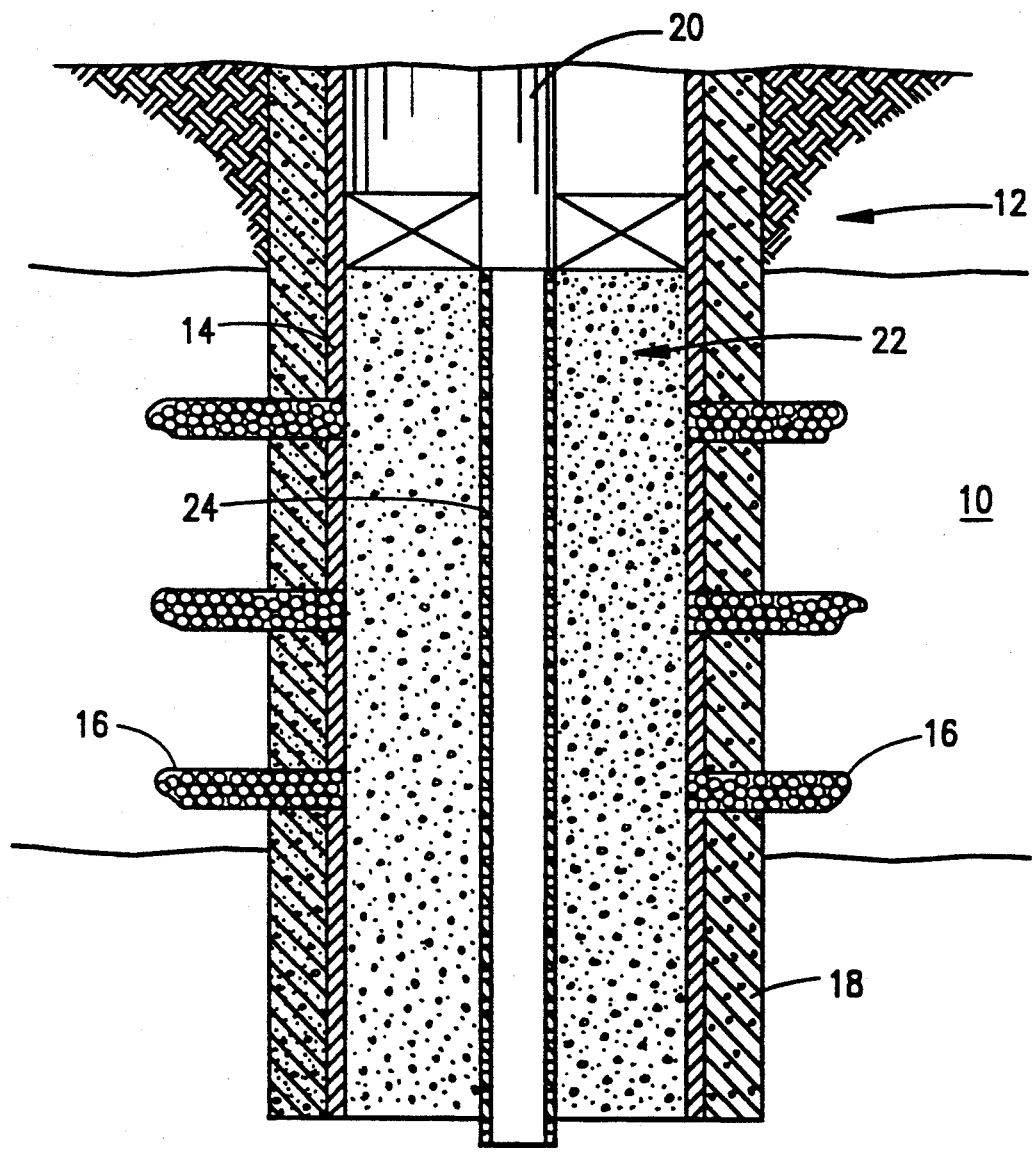

ACIDIZING METHOD FOR GRAVEL PACKING WELLS

CROSS-REFERENCE TO RELATED APPLICATIONS

This application is a continuation-in-part of Ser. No. 07/810,463, filed Dec. 19, 1991.

FIELD OF THE INVENTION

This invention relates to a sand control method for completing wells in poorly consolidated or unconsolidated formations.

BACKGROUND OF THE INVENTION

In completing wells in poorly consolidated or unconsolidated formations, consideration must be given to sand problems likely to arise during the operation of the well. The incompetent nature of this type of formation requires that a well completion technique include means for excluding sand production. Erosion and plugging effects of sand entrained in produced fluids are well known and if not arrested can seriously reduce well productivity.

The propensity of a formation to produce sand is particularly acute in formations characterized as unconsolidated or poorly consolidated. These terms, as applied to subterranean sedimentary deposits, define a particular class of sedimentary rock, the distinguishing characteristic of which is the absence of a rock matrix made up of sand grains bound into a cohesive mass.

A widely used sand control technique is the gravel pack installation which operates on the principle of forming a sand exclusion zone in surrounding relation to the wellbore. The sand exclusion zone composed of particularly graded aggregate screens out or bridges the formation sand entrained in the produced fluids. The typical gravel pack completion involves the placement of aggregate in the immediate vicinity of the wellbore and the provision of a support means for maintaining the aggregate in place. The aggregate is generally a specially graded sand or gravel, but can be other particulate material such as walnut shells, glass beads, and the like.

The placement of the aggregate immediately adjacent to the producing formation presents a major source of trouble in performing the gravel pack installation. Packing gravel into perforations is usually achieved by squeeze packing. Squeeze gravel packing is a two-stage process which includes (1) transportation of gravel slurry down through the pipe; and (2) gravel pack buildup at the formation face as fluid leaks off through the formation. In gravel packing of heterogeneous pays, frequently those perforations penetrating a lower permeability formation are at best partially packed. Additionally, even when properly packed, fluids are not produced through some perforations because formation fines accumulate in channels of the formation prior to gravel packing them. Accumulation of fines within these channels prevents hydrocarbonaceous fluids from flowing out of the reservoir into the wellbore for production to the surface.

Therefore, what is needed is a method to prevent fines from accumulating and plugging perforation channels after gravel packing a wellbore so as to increase the production of hydrocarbonaceous fluids from a reservoir.

SUMMARY OF THE INVENTION

This invention is directed to a method for gravel packing a perforated well which penetrates a formation or reservoir. In the practice of this invention, a gravel packing operation is performed in the wellbore to prevent fines migration. Once the gravel packing operation is completed, an acidizing solution is directed into the wellbore. This acidizing solution is of a composition and strength sufficient to dissolve formation sand or fines within the perforations as well as channels within the perforations which communicate with the formation and transport formation fluids into the wellbore. After the acidizing solution has removed the fines, the acidizing solution is removed from the wellbore. To prevent the channels from again filling with formation sand or fines, a consolidating agent with permeability retentive characteristics is introduced into the wellbore where it passes through the gravel pack and perforations thereby entering the formation.

The consolidating agent consolidates and binds sand grains together in said formation adjacent to the perforations. Having bound the sand grains together, the formation area adjacent to the perforations is thus consolidated. The concentration and flow rate of the consolidating agent is controlled so as to retain a desired permeability within the formation sufficient to preclude formation fines from plugging channels communicating with the formation via the perforations while allowing hydrocarbonaceous fluids to flow through the gravel pack and into the wellbore.

After consolidating the formation to preclude fines from flowing into channels communicating with the perforations, hydrocarbonaceous fluids are permitted to flow from the formation into the wellbore for production to the surface.

It is therefore an object of this invention to effectively clear formation sand or fines from perforation channels by acidizing after gravel packing the wellbore to prevent said channels from plugging prior to consolidating a radial area around the wellbore.

It is another object of this invention to increase the life and efficiency of gravel packs.

It is yet another object of this invention to maintain high sand- or fines-free fluid productivity from wells.

It is a yet further object of this invention to provide for a more efficient and uniform manner of packing perforations within a wellbore so as to minimize downtime and repacking operations caused by sand of fines entry.

BRIEF DESCRIPTION OF THE DRAWING

The drawing is a schematic representation of a wellbore wherein a gravel pack operation is conducted prior to acidizing channels in the perforations and formation.

DESCRIPTION OF THE PREFERRED EMBODIMENTS

In the practice of this invention referring to the drawing, a gravel packing operation is conducted in wellbore 12. Wellbore 12 contains a casing 14 and a cement sheath 18. Cement sheath 18 and casing 14 are penetrated by perforations 16. Tubing 20 extends down wellbore 12 and has affixed thereto slotted or wire wrapped liner 24 thus forming annulus 22 between casing 14 and slotted liner 24. Perforations 16 contain channels. Methods for gravel packing a well are known to those skilled in the art. One such method is a squeeze packing method. A method for squeeze packing a wellbore is discussed in U.S. Pat. No. 4,842,057. This patent is hereby incorporated by reference herein.

In order to obtain an effective gravel pack of perforations contained in the wellbore, it is necessary that the packing sand be transported to the perforations with the sand dispensed uniformly therein. For effective gravel packing, sand which is transported in a carrier liquid should remain dispersed in the carrier liquid until it reaches the perforations to be packed. Upon reaching the perforations, the sand should uniformly pack within the perforations and the liquid should leak-off into the formation easily.

A retrievable gravel packer and retrieving tool which can be used in the practice of this invention is discussed in U.S. Pat. No. 4,842,057 which issued to Lubiz on Jun. 27, 1989. This patent is hereby incorporated by reference herein. Gravel packing sand which can be utilized herein will generally have a U.S. sieve size of from about 6 to about 70.

Once the gravel packing operation is completed, an acidizing agent is directed into wellbore 12 which penetrates sand bearing formation 10. The acidizing agent exits slotted liner 24 whereupon it enters annulus 22 and subsequently perforations 16. Perforations 16 contain channels (not shown) which communicate with formation 10. These channels are cleared of formation fines by the acidizing agent. The acidizing agent is flowed through perforations 16 into formation 10 at a rate and concentration sufficient to remove formation sand or fines from the channels. Once sufficient time has elapsed to remove formation sand or fines from channels communicating with perforations 16 in formation 10, the acidizing agent is removed from the wellbore via slotted liner 24 and tube 20 or is pushed into the formation by a following fluid.

The acidizing agent which is used herein comprises an inhibited acid. Acids which can be utilized include hydrofluoric acid, hydrochloric acid, formic acid, acetic acid, gel acids and other similar acids known to those skilled in the art. As will be understood by those skilled in the art, the acid utilized will depend upon the composition of the formation fines and also the composition of the formation. As is expected, in most instances hydrofluoric acid will be utilized. After the elapse of a time required to dissolve the formation sand or fines from the channels of the perforations, the acidifying agent is removed from the wellbore. Acid compositions which can be used in acidizing sandstone formations are disclosed in U.S. Pat. No. 4,807,703 which issued to Jennings, Jr. on Feb. 28, 1989. This patent is hereby incorporated by reference herein.

After removing the acidizing solution from the wellbore, a sand consolidation agent is introduced into wellbore 12 in the manner similar to the introduction of the acid. The sand consolidation agent which is utilized enters the perforations and channels communicating therewith and formation 10. The consolidation agent which is utilized is able to retain the permeability of the formation while permitting hydrocarbonaceous fluids to flow from formation 10 into wellbore 12 substantially sand- or fines-free. The concentration of the consolidation agent is such as to consolidate and bind sand grains in the formation. Bound sand grains thus form a barrier to the entry of formation fines from the formation into channels contained in the perforations. In order to obtain a desired pore size in the channels and formations, additional slugs of the consolidation agent are injected or introduced into formation 10 via perforations 16 and wellbore 12.

An example of a consolidating agent which can be used herein comprises potassium silicate. Of course, as will be understood by those skilled in the art, other alkali metal silicates can be utilized. Although potassium silicate is preferred, other alkali metal silicates can be used such as sodium, potassium, or lithium.

In a preferred embodiment, urea is dissolved into said formulation of potassium silicate. At the elevated temperatures existing in a formation which are in excess of about 150° F., this consolidating agent decomposes to form a permeability retentive cement which binds and consolidates sand. Since permeability is retained, formation fluids are permitted to flow therefrom into the wellbore while preventing the production of sand.

Introduction of the consolidating agent can be continued until the formation adjacent to the perforations has been consolidated to a desired permeability so as to allow hydrocarbonaceous fluid production therethrough while preventing fines or sand production. As will be understood by those skilled in the art, the amount of consolidating agent utilized is formation dependent and may vary from formation to formation. Core samples obtained from an interval to be treated can be tested to determine the required pore size and amount of consolidation needed. U.S. Pat. No. 4,549,608 which issued to Stowe et al., teaches a method of sand control where clay particles are stabilized along a face of a fracture. This patent is hereby incorporated by reference herein.

The viscosity of the silicate solution can also determine the extent to which it will enter an interval of the formation to be treated. In those cases where it is not possible to control the viscosity of the silicate solution and preclude entry into a lower permeability zone, a mechanical packer may be used. Once the channels within formation 10 and perforations 16 have been consolidated with the desired amount of permeability, any remaining consolidating agent is removed from the wellbore.

Once the sand consolidation operation has been completed, the well is placed back on production. Fluids which flow from the formation into the wellbore will be substantially fines- or sand-free since they are prevented from entering the formation by the permeability retentive consolidated sand which has been formed in conjunction with the gravel pack. Thus, substantially fines free hydrocarbonaceous fluids will be produced from the well to the surface.

Although the present invention has been described with preferred embodiments, it is to be understood that modifications and variations may be resorted to without departing from the spirit and scope of this invention as those skilled in the art will readily understand. Such modifications and variations are considered to be within the purview and scope of the appended claims.

What is claimed is:

1. A method for removing sand or fines from hydrocarbonaceous fluids produced from a formation via a wellbore comprising:
   a) gravel packing a wellbore and perforations communicating with a productive interval of the formation;
   b) introducing an acidizing agent into the formation's near-wellbore area via perforations within the wellbore which acidizing agent is of a strength sufficient to dissolve formation sand or fines in channels contained in said formation and perforations;

c) introducing thereafter a sand consolidation agent into said perforations before said channels are blocked with formation sand or fines; and d) allowing the consolidation agent to remain in the perforations for a time sufficient to form a cement having a porosity sufficient to prevent formation fines from entering said channels and perforations thereby permitting the production of substantially fines free hydrocarbonaceous fluids to the surface.

2. The method as recited in claim 1 where the acidizing agent comprises an acid selected from a member of the group consisting of hydrofluoric acid, hydrochloric acid, formic acid, acetic acid, gel acids and mixtures thereof.

3. The method as recited in claim 1 where in step d) the consolidation agent has permeability retentive characteristics.

4. The method as recited in claim 1 where after step d) substantially sand or fines free hydrocarbonaceous fluids are produced to the surface.

5. A method for producing substantially sand or fines free hydrocarbonaceous fluids from a formation via a wellbore which comprises:

a) gravel packing the wellbore and perforations communicating with a productive interval of said formation;

b) introducing an acidizing agent into the formation's near-wellbore area via perforations within the wellbore which acidizing agent is of a strength sufficient to dissolve formation sand or fines in channels contained in said formation and perforations;

c) introducing thereafter a one-step sand consolidation agent into said perforations before said channels are blocked with formation sand or fines where said agent comprises an alkali metal silicate having therein a composition decomposable at formation temperatures sufficient to bind sand within the formation, thereby consolidating said formation while retaining a desired permeability in said formation's near-wellbore area;

d) allowing the consolidation agent to remain in the perforations and near-wellbore area for a time sufficient to form a cement having a porosity sufficient to prevent formation fines from entering said channels and perforations thereby permitting the production of substantially fines or sand free hydrocarbonaceous fluids to the surface; and e) producing substantially sand or fines free hydrocarbonaceous fluids to the surface via said wellbore.

6. The method as recited in claim 5 where the acidizing agent comprises an acid selected from a member of the group consisting of hydrofluoric acid, hydrochloric acid, formic acid, acetic acid, gel acids and mixtures thereof.

7. The method as recited in claim 5 where in step c) the consolidation agent has permeability retentive characteristics.

8. The method as recited in claim 5 where in step c) said consolidation agent decomposes at a temperature in excess of about 150° F.

9. The method as recited in claim 5 where in step c) the decomposable composition comprises urea or formamide and mixtures thereof.

* * * * *